March 10, 1931.  P. S. SHIELD  1,795,802
LIQUID MEASURING AND DISPENSING DEVICE
Filed March 8, 1929   3 Sheets-Sheet 1

INVENTOR
Paul S. Shield
BY
ATTORNEY

March 10, 1931. P. S. SHIELD 1,795,802
LIQUID MEASURING AND DISPENSING DEVICE
Filed March 8, 1929 3 Sheets-Sheet 2

Paul S. Shield INVENTOR
BY
J. F. Brandenburg ATTORNEY

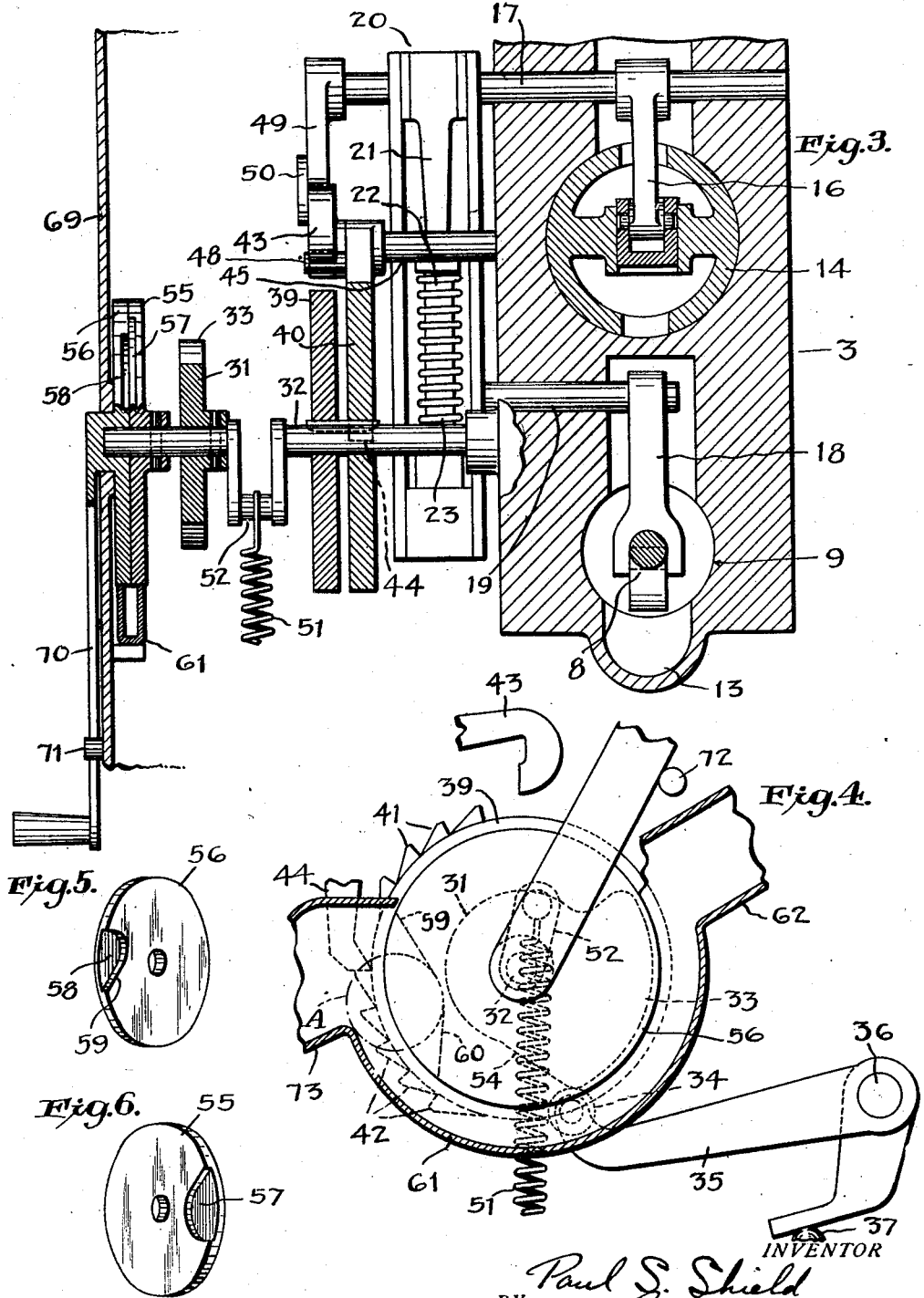

Patented Mar. 10, 1931

1,795,802

UNITED STATES PATENT OFFICE

PAUL S. SHIELD, OF CINCINNATI, OHIO, ASSIGNOR TO AUGUSTINE DAVIS, JR., OF CINCINNATI, OHIO

LIQUID MEASURING AND DISPENSING DEVICE

Application filed March 8, 1929. Serial No. 345,428.

The invention relates to liquid vending apparatus, and particularly to check-controlled apparatus for selling gasoline.

The device employs a plurality of measuring chambers, with automatic mechanism to cause each chamber to be filled in turn while another is emptying through a delivery conduit. Liquid is pumped to these chambers by the purchaser, or it may be supplied under pressure in any suitable manner, and the fluid pressure is utilized to operate the said automatic mechanism. The supply of liquid, however, is controlled by a master element, preferably a valve, which is controlled in turn by a predeterminer, the latter controlled by said automatic mechanism, and this predeterminer can be set only on the deposit of a token or check.

In the preferred embodiment of the invention, the predeterminer turns only in one direction. It is turned a certain distance through the intermediation of a check, thereupon the check is discharged and the predeterminer is carried onward by a spring or weight which then acts past a center. The action of this spring, and not that of the check-coupled agency, causes the master valve to open so that the dispenser can be operated. By then operating the dispenser, the predeterminer is permitted by an escapement to proceed under the action of said spring until the predetermined amount has been delivered, whereupon the predeterminer causes or permits the master valve to close.

In the accompanying drawings, forming part hereof:

Fig. 3 is a central vertical section taken at right angles to Figs. 1 and 2;

Fig. 4 is a fragmentary view showing the check-controlled parts in the position in which the token or check is discharged and from which the predeterminer will be carried onward by a spring;

Fig. 5 is a perspective view of a token disc; and

Fig. 6 is a perspective view of another token disc.

Figure 1:
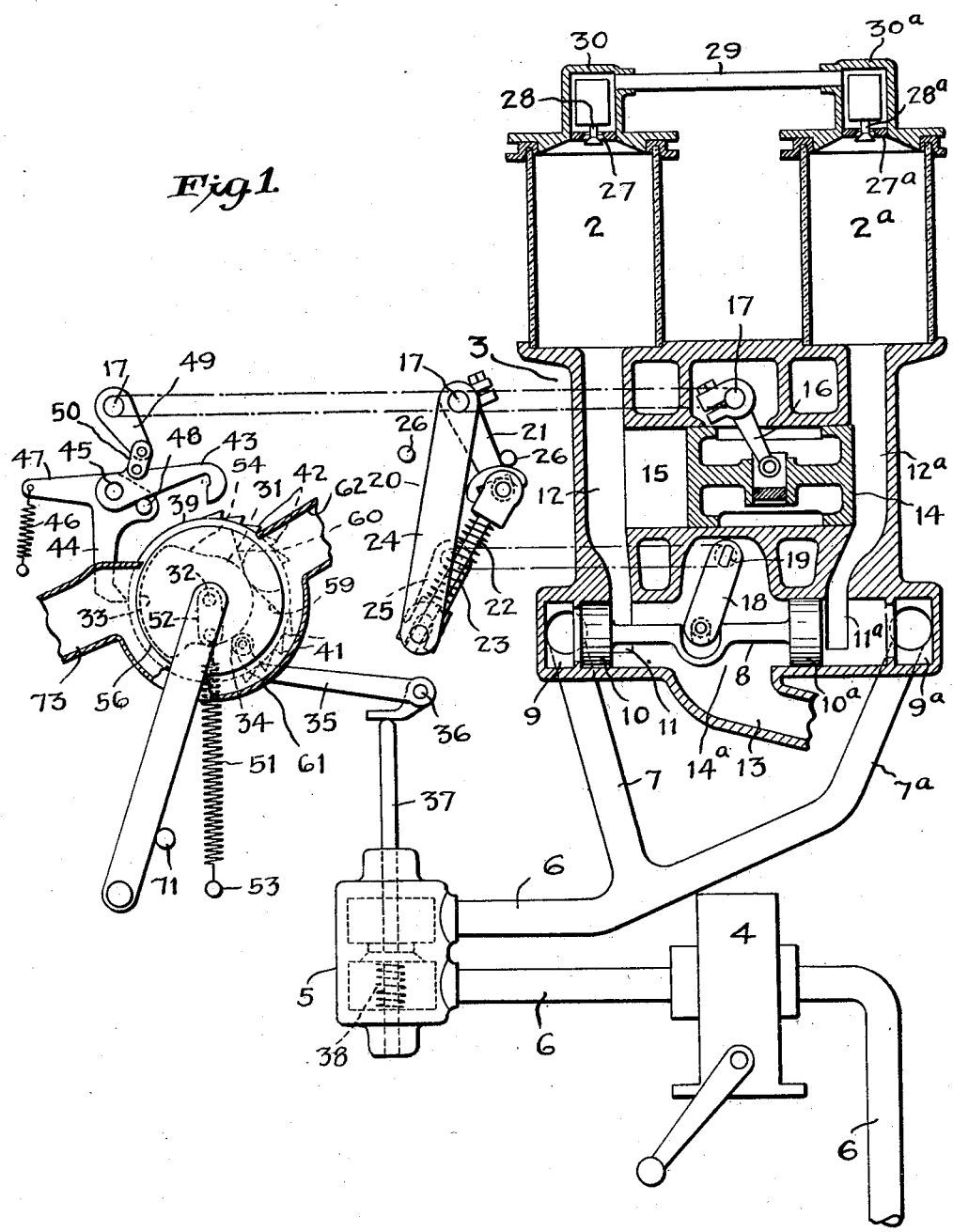
Fig. 1 is a schematic view, principally in vertical section, illustrating the invention, mechanisms which would lie one behind another being shown side by side and shafts on which a plurality of parts are mounted being projected by broken lines.

The apparatus has twin measuring chambers 2 and 2ª, mounted on a suitable frame or casting 3 containing passages and piston chambers. In actual practice this casting is supported on a suitable pedestal or casing, which it has not been thought necessary to illustrate and which contains or supports a pump 4, a master valve 5, and a supply conduit 6 leading from the underground reservoir to the pump, thence to the valve 5, and thence to automatic valve mechanism in the casting 3 which controls the flow of liquid so that one chamber 2 empties while the other is being filled, and vice-versa. This last portion of the supply conduit divides into two branches 7 and 7ª.

The automatic valve mechanism preferably includes a double piston valve 8 operating in cylinder chambers 9 and 9ª. The branches 7 of the conduit 6 open into the outer ends of these chambers, and the heads 10 and 10ª of the valve are adapted to travel past ports 11 and 11ª which communicate with passages 12 and 12ª in the casting 3, these passages or spaces extending downward from the bottoms of the measuring chambers 2. A delivery conduit 13 leads from a space 14ª located between the piston valve chambers 9 and forming part of the same general cavity therewith. It may be understood that a delivery hose is connected with the outer portion of this conduit.

The arrangement is such that the valve 8 reciprocates between extreme portions, in one of which the head 10 cuts off the port 11 from the branch 7 of the supply conduit and places said port in communication with the delivery conduit 13, while at the same time the head 10ª cuts off the port 11ª from the delivery conduit and places that port in communication with the branch 7ª of the supply conduit.

In the other position of the valve 8, these conditions are reversed.

A double-ended pressure actuated piston 14 operates in a cylinder chamber 15 which extends between and in communication with the spaces 12 and 12ᵃ. A rocker-arm 16 operatively connects this piston with a rock-shaft 17. Another rocker-arm 18 operatively connects the four-way reversing valve 8 with a rock-shaft 19.

A quick-throw mechanism 20 is interposed between the rock-shafts 17 and 19. This mechanism may comprise a rocker-arm 21 fixed to the rock-shaft 17 and having articulated connection with a telescopic link 22 containing a compression spring 23, the link 22 being pivotally connected with the lower end of a link 24, which, in turn, is freely pivoted at its upper end on the rock-shaft 17. The links 22 and 24 are loosely connected at their lower ends with a rocker-arm 25 which is fixed to the rock-shaft 19. Spaced abutments 26 cooperate with the arm 21.

The measuring chambers 2 and 2ᵃ have vents 27 and 27ᵃ at the top, each adapted to be closed when its chamber is filled with liquid, by a float valve 28 or 28ᵃ. A conduit 29 may connect the float chambers 30 and 30ᵃ.

When the master valve 5 is open, operation of the pump 4 will supply liquid to the measuring chamber 2ᵃ (assuming the parts to be in the position of Fig. 1), until that chamber is filled and its vent valve 28ᵃ is automatically closed. The operator or customer continues to pump, and the pressure on the liquid which then develops in the chamber 2ᵃ and its connected spaces 12ᵃ and 9ᵃ acts on the right-hand end of the piston 14 so as to move the latter to the left. This movement rocks the shaft 17 and straightens the links 21 and 22, compressing the spring 23. As soon as these links are carried past their line of centers, the spring 23 quickly throws the toggle to a position reverse to that shown in Fig. 1, thereby throwing the link 24 to the right. This in turn quickly shifts the reversing valve 8 to its other extreme position, whereupon the measured quantity of liquid flows out of the chamber 2ᵃ and its passage space 12ᵃ to and through the delivery conduit 13, while liquid from the pump proceeds to enter the measuring chamber 2.

This cycle of operations is repeated until the master valve 5 is closed, preventing any more liquid being supplied to the measuring chambers and the automatic valve mechanism.

It will be understood that the capacity of each measuring chamber is inclusive of its passage space 12 or 12ᵃ. This capacity may be one gallon, for example, or any other suitable predetermined volume.

The type of dispensing meter illustrated is known, a similar meter being disclosed in the Carbonaro Patent 1,612,488, dated December 28, 1926. Consequently, the present invention does not reside in the particular construction of the meter and the automatic mechanism which has been described.

A predeterminer disc 31 is fixed to a rotatable shaft 32 which is journaled in suitable supports on the vending machine. This predeterminer controls the master valve 5. As shown, it is provided with a cam projection 33 adapted to act on a roller 34 on the end of a lever 35, which is fulcrumed at 36 on a stationary pivot and is arranged to act on the stem 37 of the valve 5, so that when the cam projection passes under the roller 34 the said valve is opened against the action of its spring 38, while when the roller rests on the low portion of the periphery of the disc this valve is closed.

Two ratchet or escapement wheels 39 and 40 are also fixed, side by side, on the shaft 32. The wheel 39 has a series of teeth 41 extending over a portion of its periphery, and the wheel 40 has another series of teeth 42 extending over a portion of its periphery, these two sets of teeth being in different positions on the two wheels. Naturally the two wheels might be consolidated in one member, as they virtually are.

Figure 2:
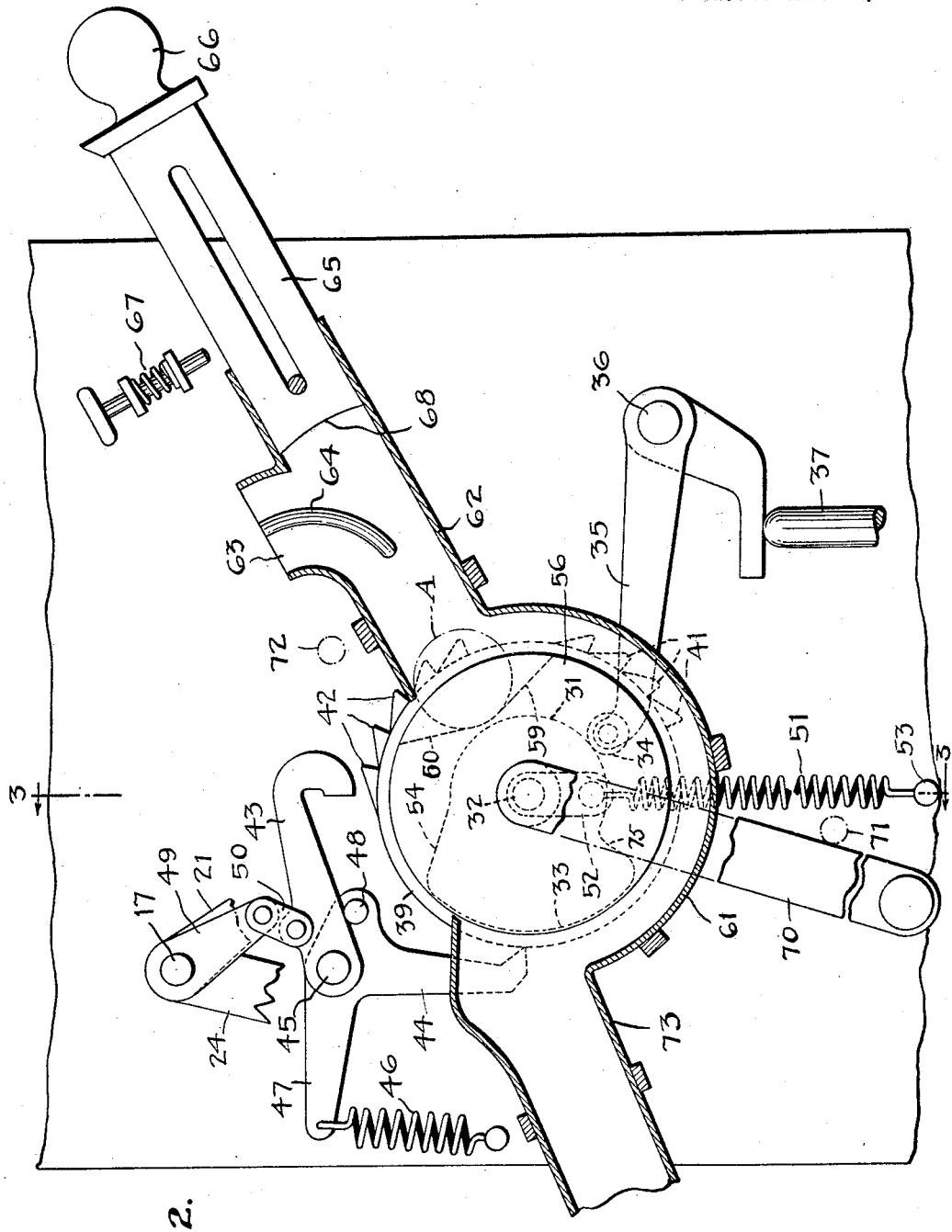
Fig. 2 is a sectional view on a larger scale showing the check-controlled parts and parts immediately associated therewith in normal or idle position.

The teeth 41 and 42 are designed to cooperate, respectively, with escapement dogs 43 and 44. In the idle condition of the mechanism the escapement wheels 39 and 40 are in such positions that the teeth 41 and 42 are rotationally at considerable distances from the escapement dogs, and must turn through such distance in the clockwise direction (looking as in Figs. 1, 2 and 4) before the first tooth of the series 42 abuts against the dog 44.

The dogs are independently pivoted on a fixed pin 45, and a spring 46 acts on an arm 47 of the dog 44 to hold the latter in, and to restore it to, a position in which it will intercept the teeth 42. A pin 48 on this dog acts on the dog 43, so that the action of said spring normally holds this dog out of the path of the teeth 41.

The escapement is actuated from some part of the automatic mechanism of the meter, preferably from the shaft 17, which is provided with an arm 49, which is connected with the dog 43 by a link 50. The arrangement is such that the oscillatory shaft 17 makes a single movement stroke for each quantity delivered from one of the measuring chambers. In the course of such movement whether in one direction or the other, the dog 44 is withdrawn from a tooth 42 and the dog 43 is moved into the path of a tooth 41, permitting the predeterminer 31 to turn half a step, whereupon the dog 43 is withdrawn and the dog 44 advanced, permitting the predeterminer to advance another half step.

The predeterminer and the escapement wheels are acted upon by a spring 51 which is connected at one end to a crank 52 on the shaft 32 and at the other end to a fixed anchorage 53. The spring normally holds the parts 31, 39 and 40 in the positions represented in Figs. 1 and 2. When the shaft and these parts are turned manually, as will be described presently, in a clockwise direction more than 180° from this position, so that the pull of the spring is past center, the spring will then carry the parts onward in the same direction back to the original position. One part of this movement under the action of the spring 52 will carry the cam slope 54 under the roller 34 of the arm 35, thereby opening the master valve 5, which remains open as long as the roller is on the high concentric surface of the cam projection. This surface is of such extent that the master valve remains open for a predetermined number of operations of the meter, corresponding to the amount of liquid which is to be delivered for the deposit of one token, check or coin, as hereinafter described.

Two token discs 55 and 56 are mounted on the shaft 32, the disc 55 being fixed to the shaft, and the disc 56 being loose on the shaft in the sense that this disc and the shaft can turn relatively to each other.

These two discs are provided in their contiguous faces with complemental pockets 57 and 58, which, when in registry, are adapted to receive a circular token A, or it could be a coin, to couple the two discs together. These pockets extend inward from the peripheries of the discs and are adapted to receive the token lying in a plane parallel with the faces of the discs 55 and 56 and perpendicular to the axis of the shaft 32.

The rear side of the pocket 58 of the disc 56 preferably conforms to the circular contour of the token, while the forward side 59 of this pocket may extend off at more or less of a tangent. In the disc 55 the forward side of the pocket 57 preferably conforms to the circle of the token, while the rear side 60 may be cut away. The depth of the pockets may be varied, and, depending upon their depth, half the diameter of the token, or more or less than half the diameter, may be received therein.

If less than half the token is received in the pockets, force applied to the disc 56, transmitted through the token to the disc 55, to turn the latter and the connected parts in the clockwise direction will tend to squeeze the token out of the pockets. That may be prevented by a stationary arcuate guard, trough or raceway 61 spaced from and concentric with the peripheries of the discs 55 and 56 and extending under the discs from the place where the token is received by the discs to the place where it is discharged. Even if half or more than half of the token is received in the pockets, so that there is little or no tendency to force the token radially outward, such a guard serves the purpose of keeping the token from dropping out before the time for its discharge.

The token is conducted to the receiving position by a token chute 62 having a lateral (or upward) entrance 63, through which the token is inserted edgewise. This entrance is shown provided with a curved rib 64 to fit a curved groove in the face of the token, as in my copending application Serial No. 338,732, filed February 9, 1929.

A hand-operated slide 65 may be arranged to operate lengthwise in the token chute, this slide having a handle 66 at its outer end. If this slide is employed, it is drawn out to clear the entrance 63 before a token is deposited and is then pushed inward. A detent 67 may be provided for holding the slide in its inward position. The inner end 68 of the slide is curved to form a continuation of the guard or raceway 61, when the slide is in this inward position. The slide may also serve to seat the token positively in the pockets of the token discs.

The disc 55 is normally held by the spring 51 in the position in which its pocket 57 registers with the end of the token chute 62. Means could be provided for holding the disc 56 in a similar position, otherwise this disc will be moved by hand to the said position.

It will be understood that the various parts which have been described are housed inside a suitable casing or wall 69, a portion of which is shown in Fig. 3. Outside of this wall there is a handle 70 by means of which the disc 56 can be turned. Fixed stops 71 and 72 on this wall, or on any other suitable part, cooperate with the handle 70, or with the disc 56, to limit the movement of the latter in each direction.

At a point more than 180° distant from the end of the token chute 62, there is a discharge chute or exit 73, through which the token will be discharged or ejected, to pass to a suitable collection receptacle inside the casing.

It will naturally be understood that the wall or casing 69 is to be so arranged that the entrance 63 to the coin-chute opens through or outside the wall, and that the handle 66 of the slide 65 and the detent 67 are likewise on the outside.

The operation will be briefly described. An intending purchaser pulls out the slide 65, and inserts a token. Before the token can enter the pockets of the discs 55 and 56, the disc 56 must be turned counter-clockwise to the receiving position, if it is not already in that position. This position of the disc 56 is determined by the stop 71. With the pockets 57 and 58 in registry with each other and opposite the lower end of the token chute 62, the token drops into the pockets, or will be seated therein by inward movement of the slide. These discs are now coupled, and the customer moves the handle 70 as far as it will go in the clockwise direction, the limit of movement in this direction being determined by the stop 72.

As long as the discs 55 and 56 remain coupled by the token, the disc 56 drives the disc 55, and with the latter the shaft 32, the predeterminer 31 and the escapement wheels 39 and 40. Further movement of the disc 56 is stopped when the pockets 57, 58, with the token therein, are at the exit 73. The cam projection 33 of the predeterminer has not yet acted on the roller 34, so that the master valve 5 is still closed. Thus, the master valve is not opened by effort exerted by the purchaser. In the condition where further turning of the driving disc 56 is stopped, the point of connection of the spring 51 with the shaft 32 has been carried somewhat past center, so that this spring, which was previously stretched, now carries the driven disc 55 onward in the same direction that it was moved by hand through the intermediation of the token. The first effect of this movement of the disc 55 relative to the disc 56 is to eject the token, which passes away through the chute 73. As the spring continues to turn the shaft 32, the disc 55, the predeterminer 31 and the escapement wheels 39 and 40, it causes the slope 54 of the predeterminer to pass under the roller 34, camming this roller onto the high surface 33 of the predeterminer. Thereby the master valve 5 is opened. The spring continues to turn the parts fixed to the shaft 32 until the first tooth of the series of teeth 42 abuts against the tip of the dog 44.

The customer now operates the pump 4 by means of its handle, which is accessible, and pumps liquid to the meter. The meter and its mode of operation need not again be described, beyond saying that the pressure on the fluid automatically operates, or causes the operation of, mechanism including the rockshaft 17, in step with the measuring and delivering of the quantities. In this way the escapement, including the dogs 44 and 45, is operated, to permit, or cause, the predeterminer 31 to turn until the last quantity is being delivered, at which time the predeterminer has been turned far enough so that the roller 34 drops off the abrupt, rear end 75 of the cam projection 33, causing the master valve 5 to close and preventing further supply of liquid to the meter.

In the particular instance illustrated, the escapement wheel 39 is shown provided with four teeth 41 and the wheel 40 is shown as having five teeth 42. This may correspond to a delivery of five gallons for each token placed in the machine. Obviously, the number of teeth may be greater or less, for a larger or a smaller delivery. As already stated, the capacity of one of the measuring vessels 2, 2$^a$, together with that of the space 12 or 12$^a$, need not be one gallon. It could be two gallons, or any other unit or multiple or fraction of a unit, or an arbitrary quantity, adjustable or not by suitable means to regulate the deliveries in accordance with the market price of the commodity.

The invention is not necessarily limited to the particular construction and mode of operation which have been illustrated and described. For example, it will suggest itself to those skilled in the art that the predeterminer can be controlled by the meter so as to be operated in conformity therewith, to bring about the closing of the master valve between the pump and the meter at the proper time, without the employment of an escapement, and whether the predeterminer is spring actuated or not. Nevertheless, the general form of mechanism which has been described is preferred for its special advantages. While a master valve between a pump and the meter is preferred as the immediate means for stopping the supply of liquid to the meter, it will naturally suggest itself that other means may be utilized for stopping, interrupting or preventing such supply.

I claim:

1. A liquid vending device having a plurality of measuring chambers, means for conducting liquid therefrom, means for supplying liquid to said chambers, automatic mechanism operable by fluid pressure to cause each chamber in turn to be filled while another is emptying, a master element commanding the supply of liquid to said chambers to operate said mechanism, a rotatable predeterminer controlling said master element, said predeterminer adapted to turn in one direction, manual means for turning said predeterminer in said direction through the intermediation of a check to a position in which the check is discharged, a spring which then acts past a center for carrying said predeterminer onward in the same direction, thereby causing said master element to permit the supply of liquid, and an escapement for said predeterminer controlled by said mechanism to allow the predeterminer to proceed farther under the action of said spring until it causes the master element to stop the supply.

2. Check-controlled apparatus, comprising two members respectively driving and driven, side by side on a common axis, provided with complementary pockets adapted to receive a coupling check in a plane perpendicular to said axis, a chute adapted to deliver a check to said pockets when the latter are in a receiving position, a curved guard extending under said members from a receiving position to a discharging position, dispensing means under the control of the driven one of said members, manual means for turning the driving disc and thereby the driven disc to a certain position, where the check is discharged, automatic means for carrying the driven member onward in the same direction and for then controlling said dispensing means, and a slide in said chute adapted to be pushed in after a check so that its end prevents the check from being expelled backward into the chute when the driving disc is turned.

3. Check-controlled apparatus, comprising two members respectively driving and driven, side by side on a common axis, provided with complementary pockets adapted to receive a circular coulping check in a plane perpendicular to said axis, a chute adapted to deliver a check to said pockets when the latter are in a receiving position, the entrance portion of said chute having a curved rib to correspond with a groove in the check, and a slide adapted to insure that a deposited check will be entered in said pockets.

PAUL S. SHIELD.